(12) United States Patent
Fennewald et al.

(10) Patent No.: US 7,196,295 B2
(45) Date of Patent: Mar. 27, 2007

(54) TWO-WIRE LAYERED HEATER SYSTEM

(75) Inventors: Kenneth F. Fennewald, Maryland Heights, MO (US); William A. McDowell, III, Aurora, IL (US); Kevin Ptasienski, O'Fallon, MO (US); Louis P. Steinhauser, St. Louis, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 73 days.

(21) Appl. No.: 10/719,327

(22) Filed: Nov. 21, 2003

(65) Prior Publication Data

US 2005/0109767 A1     May 26, 2005

(51) Int. Cl.
*H05B 3/16*     (2006.01)

(52) U.S. Cl. ............... 219/543; 219/212; 219/538; 219/542; 219/553; 219/483; 219/241

(58) Field of Classification Search ............ 219/212, 219/444.1, 538, 543, 553, 542, 505, 504, 219/494, 490, 241, 483, 485; 318/727; 347/85
See application file for complete search history.

(56) References Cited

U.S. PATENT DOCUMENTS

| | | | |
|---|---|---|---|
| 4,549,073 A | 10/1985 | Tamura et al. | |
| 4,623,969 A | 11/1986 | Bensoussan et al. | |
| 4,638,147 A | 1/1987 | Dytch et al. | |
| 4,688,547 A | 8/1987 | Ballard et al. | |
| 4,713,525 A | 12/1987 | Eastep | |
| 4,736,091 A | 4/1988 | Moe | |
| 4,829,447 A | 5/1989 | Parker et al. | |
| 4,843,084 A | 6/1989 | Parker et al. | |
| 5,036,181 A | 7/1991 | Fishman | |
| 5,072,098 A | 12/1991 | Matthews et al. | |
| 5,105,067 A | 4/1992 | Brekkestran et al. | |
| 5,280,422 A | 1/1994 | Moe et al. | |
| 5,504,307 A * | 4/1996 | Hayashi et al. | 219/543 |
| 5,521,850 A | 5/1996 | Moe et al. | |
| 5,665,262 A * | 9/1997 | Hajaligol et al. | 219/553 |
| 5,973,296 A | 10/1999 | Juliano et al. | |
| 6,043,467 A * | 3/2000 | Little | 219/542 |
| 6,222,166 B1 * | 4/2001 | Lin et al. | 219/538 |
| 6,305,923 B1 | 10/2001 | Godwin et al. | |
| 6,341,954 B1 | 1/2002 | Godwin et al. | |

(Continued)

FOREIGN PATENT DOCUMENTS

DE     EP745919     * 12/1996

(Continued)

*Primary Examiner*—Robin Evans
*Assistant Examiner*—Leonid M. Fastovsky
(74) *Attorney, Agent, or Firm*—Harness, Dickey & Pierce P.L.C.

(57) ABSTRACT

A heater system is provided with a layered heater in communication with a two-wire controller, wherein a resistive layer of the layered heater is both a heater element and a temperature sensor. The two-wire controller thus determines temperature of the layered heater using the resistance of the resistive layer and controls heater temperature through a power source. Furthermore, a heater system using a layered heater in communication with a two-wire controller for a specific application of a hot runner nozzle in an injection molding system is provided by the present invention.

13 Claims, 12 Drawing Sheets

U.S. PATENT DOCUMENTS

| | | |
|---|---|---|
| 6,448,538 B1 * | 9/2002 | Miyata .................... 219/444.1 |
| 6,489,742 B2 * | 12/2002 | Lumsden .................... 318/727 |
| 6,575,729 B2 | 6/2003 | Godwin et al. |
| 6,752,491 B2 * | 6/2004 | Waggoner et al. ............ 347/85 |
| 6,762,396 B2 * | 7/2004 | Abbott et al. ............... 219/543 |
| 6,770,848 B2 * | 8/2004 | Haas et al. ................. 219/212 |
| 2001/0014373 A1 * | 8/2001 | Lin et al. .................... 427/454 |

FOREIGN PATENT DOCUMENTS

| | | | |
|---|---|---|---|
| DE | 019745966 | * | 10/1998 |
| JP | 04206602 | * | 11/1990 |

* cited by examiner

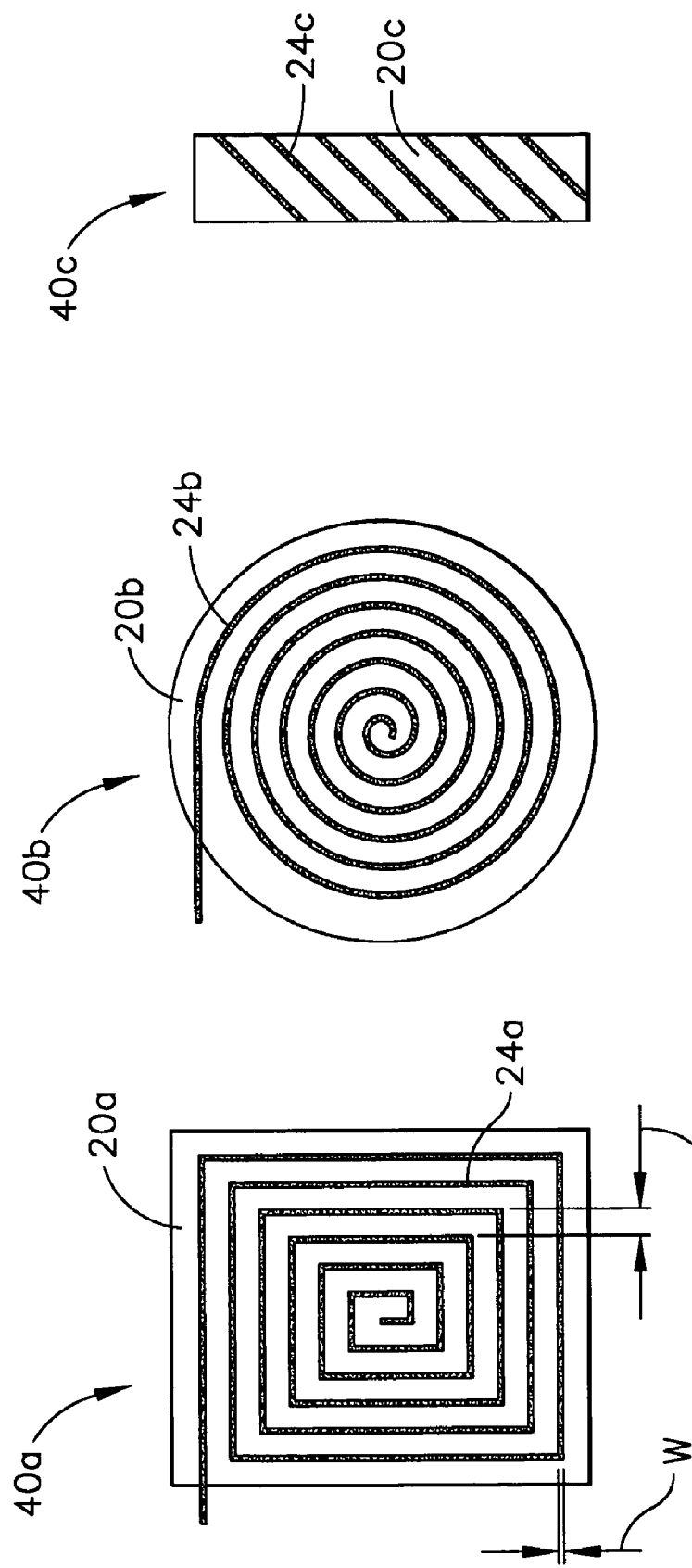

TWO-WIRE LAYERED HEATER SYSTEM

FIELD OF THE INVENTION

The present invention relates generally to electrical heaters and controllers and more particularly to temperature sensing for layered heaters.

BACKGROUND OF THE INVENTION

Layered heaters are typically used in applications where space is limited, when heat output needs vary across a surface, or in ultra-clean or aggressive chemical applications. A layered heater generally comprises layers of different materials, namely, a dielectric and a resistive material, which are applied to a substrate. The dielectric material is applied first to the substrate and provides electrical isolation between the substrate and the resistive material and also minimizes current leakage during operation. The resistive material is applied to the dielectric material in a predetermined pattern and provides a resistive heater circuit. The layered heater also includes leads that connect the resistive heater circuit to a heater controller and an over-mold material that protects the lead-to-resistive circuit interface. Accordingly, layered heaters are highly customizable for a variety of heating applications.

Layered heaters may be "thick" film, "thin" film, or "thermally sprayed," among others, wherein the primary difference between these types of layered heaters is the method in which the layers are formed. For example, the layers for thick film heaters are typically formed using processes such as screen printing, decal application, or film printing heads, among others. The layers for thin film heaters are typically formed using deposition processes such as ion plating, sputtering, chemical vapor deposition (CVD), and physical vapor deposition (PVD), among others. Yet another process distinct from thin and thick film techniques is thermal spraying, which may include by way of example flame spraying, plasma spraying, wire arc spraying, and HVOF (High Velocity Oxygen Fuel), among others.

Known systems that employ layered heaters typically include a separate temperature sensor, which is connected to the controller through another set of electrical leads in addition to the set of leads for the resistive heater circuit. The temperature sensor is often a thermocouple that is placed somewhere near the film heater and/or the process in order to provide the controller with temperature feedback for heater control. However, the thermocouple is relatively bulky, requires additional electrical leads, and fails relatively frequently. Alternately, an RTD (resistance temperature detector) may be incorporated within the layered heater as a separate layer in order to obtain more accurate temperature readings and to reduce the amount of space required as compared with a conventional thermocouple. Unfortunately, the RTD also communicates with the controller through an additional set of electrical leads. For systems that employ a large number of temperature sensors, the number of associated electrical leads for each sensor is substantial and results in added bulk and complexity to the overall heater system.

For example, one such application where electrical leads add bulk and complexity to a heater system is with injection molding systems. Injection molding systems, and more specifically hot runner systems, often include a large number of nozzles for higher cavitation molding, where multiple parts are molded in a single cycle, or shot. The nozzles are often heated to improve resin flow, and thus for each nozzle in the system, an associated set of electrical leads for a nozzle heater and a set of electrical leads for at least one temperature sensor (e.g., thermocouple) placed near the heater and/or the process must be routed from a control system to each nozzle. The routing of electrical leads is typically accomplished using an umbilical that runs from the control system to a hot runner mold system. Further, wiring channels are typically milled into plates of the mold system to route the leads to each nozzle, and therefore, an increased number of electrical leads adds cost and complexity to the hot runner mold system and adds bulk to the overall injection molding system.

SUMMARY OF THE INVENTION

In one preferred form, the present invention provides a heater system comprising a thick film heater and a two-wire controller. The thick film heater defines a substrate, a dielectric layer disposed on the substrate, and a resistive layer disposed on the dielectric layer, wherein the resistive layer has sufficient temperature coefficient of resistance characteristics such that the resistive layer is a heater element and a temperature sensor. Further, a protective layer is disposed over the resistive layer and the two-wire controller determines temperature of the thick film heater using the resistance of the resistive layer and controls heater temperature accordingly.

In another form, a layered heater is provided that comprises at least one resistive layer, wherein the resistive layer has sufficient temperature coefficient of resistance characteristics such that the resistive layer is a heater element and a temperature sensor. The layered heater further comprises a two-wire controller connected to the resistive layer, wherein the two-wire controller determines temperature of the layered heater using the resistance of the resistive layer and controls heater temperature accordingly. In the various forms of the invention, the layered heater is a thick film heater, a thin film heater, a thermally sprayed heater, and a sol-gel heater.

In yet another form, a hot runner nozzle heater system is provided that comprises at least one runner nozzle and at least one resistive layer disposed proximate the runner nozzle, wherein the resistive layer has sufficient temperature coefficient of resistance characteristics such that the resistive layer is a heater element and a temperature sensor. The heater system further comprises a two-wire controller connected to the resistive layer, wherein the two-wire controller determines temperature of the heater system using the resistance of the resistive layer and controls heater system temperature accordingly.

Additionally, the present invention provides a heater system for use with an existing temperature controller having at least one temperature sensor input and a power output. The invention is an improvement that comprises at least one layered heater having at least one resistive layer, wherein the resistive layer has sufficient temperature coefficient of resistance characteristics such that the resistive layer is a heater element and a temperature sensor. The improvement further comprises at least one two-wire module connected to the layered heater and to the temperature controller, wherein the two-wire module determines temperature of the layered heater using the resistance of the resistive layer and transmits the temperature of the layered heater to the temperature controller input, and the temperature controller transmits the power output to the two-wire module.

In still another form, a heater system is provided that comprises a layered heater having at least one resistive layer, wherein the resistive layer has sufficient temperature coefficient of resistance characteristics such that the resistive layer is a heater element and a temperature sensor. The heater system further comprises an electrical lead connected to the resistive layer and a controller connected to the resistive layer through the electrical lead, wherein the controller determines temperature of the layered heater using the resistance of the resistive layer and controls heater temperature accordingly. Additionally, a common return device is connected to the layered heater and a power source is connected to the controller, wherein the common return device provides an electrical return to the controller from the layered heater such that only a single wire is required for operation of the heater system.

According to a method of the present invention, operation of a layered heater is provided that comprises the steps of supplying power to the heater through a set of leads to a resistive element of the layered heater and calculating the temperature of the resistive element using a two-wire controller in communication with the layered heater through the set of leads, wherein the resistive element is a heater element and a temperature sensor. In another form, the method is used to operate a layered heater in conjunction with a hot runner nozzle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4a is a plan view of a resistive layer pattern constructed in accordance with the teachings of the present invention;

FIG. 4b is a plan view of a second resistive layer pattern constructed in accordance with the principles of the present invention;

FIG. 4c is a perspective view of a third resistive layer pattern constructed in accordance with the principles of the present invention;

Corresponding reference numerals indicate corresponding parts throughout the several views of the drawings.

DETAILED DESCRIPTION OF THE PREFERRED EMBODIMENTS

The following description of the preferred embodiments is merely exemplary in nature and is in no way intended to limit the invention, its application, or uses.

Figure 1:
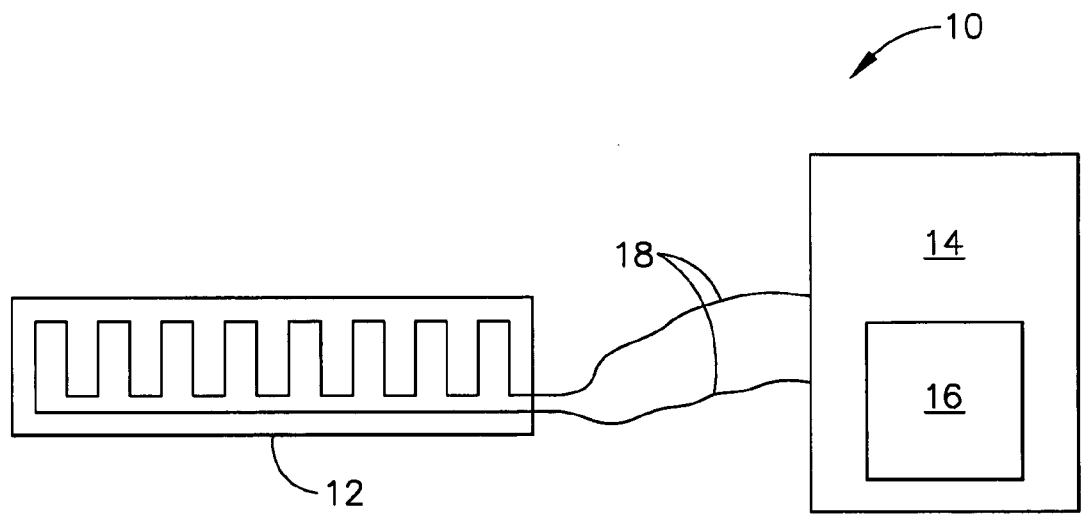
FIG. 1 is a block diagram of a heater system in accordance with the principles of the present invention.

Referring to FIG. 1, a simplified heater system in block diagram format in accordance with one form of the present invention is illustrated and generally indicated by reference numeral 10. The heater system 10 comprises a layered heater 12, a two-wire controller 14, which is preferably microprocessor based, and a power source 16 within or connected to the two-wire controller 14. The layered heater 12 is connected to the two-wire controller 14 as shown through a single set of electrical leads 18. Power is provided to the layered heater 12 through the electrical leads 18, and temperature information of the layered heater 12 is provided on command to the two-wire controller 14 through the same set of electrical leads 18. More specifically, the two-wire controller 14 determines the temperature of the layered heater 12 based on a calculated resistance, one technique of which is described in greater detail below. The two-wire controller 14 then sends signals to the power source 16 to control the temperature of the layered heater 12 accordingly. Therefore, only a single set of electrical leads 18 is required rather than one set for the heater and one set for a temperature sensor.

Figure 2:
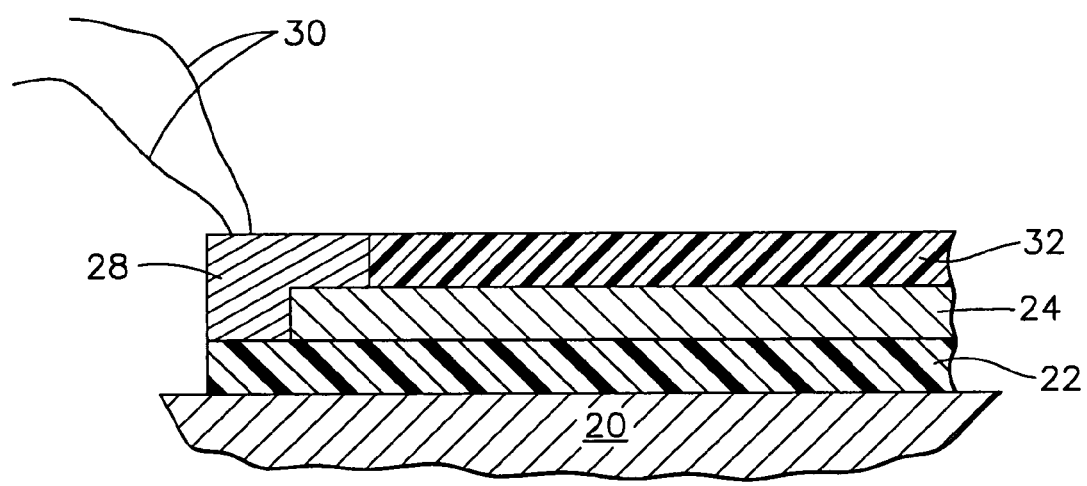
FIG. 2 is an enlarged cross-sectional view of a layered heater in accordance with the principles of the present invention.

Referring now to FIG. 2, in one form the layered heater 12 comprises a number of layers disposed on a substrate 20, wherein the substrate 20 may be a separate element disposed proximate the part or device to be heated, or the part or device itself. As shown, the layers preferably comprise a dielectric layer 22, a resistive layer 24, and a protective layer 26. The dielectric layer 22 provides electrical isolation between the substrate 20 and the resistive layer 24 and is disposed on the substrate 20 in a thickness commensurate with the power output of the layered heater 12. The resistive layer 24 is disposed on the dielectric layer 22 and provides two primary functions in accordance with the present invention. First, the resistive layer 24 is a resistive heater circuit for the layered heater 12, thereby providing the heat to the substrate 20. Second, the resistive layer 24 is also a temperature sensor, wherein the resistance of the resistive layer 24 is used to determine the temperature of the layered heater 12 as described in greater detail below. The protective layer 26 is preferably an insulator, however other materials such as a conductive material may also be employed according to the requirements of a specific heating application while remaining within the scope of the present invention.

As further shown, terminal pads 28 are disposed on the dielectric layer 22 and are in contact with the resistive layer 24. Accordingly, electrical leads 30 are in contact with the terminal pads 28 and connect the resistive layer 24 to the two-wire controller 14 (not shown) for power input and for transmission of heater temperature information to the two-wire controller 14. Further, the protective layer 26 is disposed over the resistive layer 24 and is preferably a dielectric material for electrical isolation and protection of the resistive layer 24 from the operating environment. Since the resistive layer 24 functions as both a heating element and a temperature sensor, only one set of electrical leads 30, (e.g., two wires), are required for the heater system 10, rather than one set for the layered heater 12 and another set for a separate temperature sensor. Thus, the number of electrical leads for any given heater system is reduced by 50% through the use of the heater system 10 according to the present invention. Additionally, since the entire resistive layer 24 is a temperature sensor in addition to a heater element, temperature is sensed throughout the entire heater element rather than at a single point as with many conventional temperature sensors such as a thermocouple.

Figure 3A:
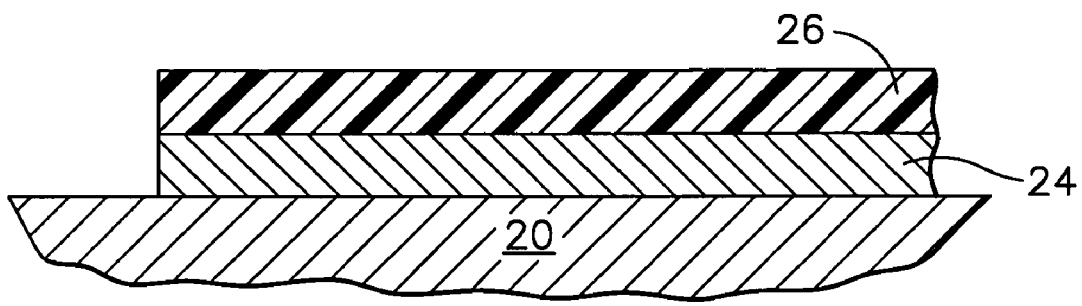
FIG. 3a is an enlarged cross-sectional view of a layered heater comprising a resistive layer and a protective layer in accordance with the principles of the present invention.
Figure 3B:
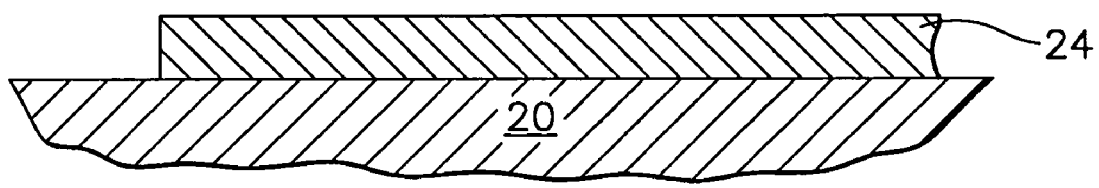
FIG. 3b is an enlarged cross-sectional view of a layered heater comprising only a resistive layer in accordance with the principles of the present invention.

In another form of the present invention as shown in FIG. 3a, the resistive layer 24 is disposed on the substrate 20 in the case where the substrate 20 is not conductive and electrical isolation is not required through a separate dielectric layer. As shown, the protective layer 26 is disposed over the resistive layer 24 as previously described. In yet another form as shown in FIG. 3b, the resistive layer 24 is disposed on the substrate 20 with no dielectric layer 22 and no protective layer 26. Accordingly, the heater system 10 of the present invention is operable with at least one layer, namely, the resistive layer 24, wherein the resistive layer 24 is both a heating element and a temperature sensor. Other combinations of functional layers not illustrated herein may also be employed according to specific application requirements while remaining within the scope of the present invention.

Generally, the layered heater 12 is configured for operation with any number of devices that require heating, one of which is hot runner nozzles for injection molding systems as described in greater detail below. Furthermore, the layered heater 12 is preferably a thick film heater that is fabricated using a film printing head in one form of the present invention. Fabrication of the layers using this thick film process is shown and described in U.S. Pat. No. 5,973,296, which is commonly assigned with the present application and the contents of which are incorporated herein by reference in their entirety. Additional thick film processes may include, by way of example, screen printing, spraying, rolling, and transfer printing, among others.

However, in another form, the layered heater 12 is a thin film heater, wherein the layers are formed using thin film processes such as ion plating, sputtering, chemical vapor deposition (CVD), and physical vapor deposition (PVD), among others. Thin film processes such as those disclosed in U.S. Pat. Nos. 6,305,923, 6,341,954, and 6,575,729, which are incorporated herein by reference in their entirety, may be employed with the heater system 10 as described herein while remaining within the scope of the present invention. In yet another form, the layered heater 12 is a thermal sprayed heater, wherein the layers are formed using thermal spraying processes such as flame spraying, plasma spraying, wire arc spraying, and HVOF (High Velocity Oxygen Fuel), among others. In still another form, the layered heater 12 is a "sol-gel" heater, wherein the layers are formed using sol-gel materials. Generally, the sol-gel layers are formed using processes such as dipping, spinning, or painting, among others. Thus, as used herein, the term "layered heater" should be construed to include heaters that comprise at least one functional layer (e.g., resistive layer 24 only, resistive layer 24 and protective layer 26, dielectric layer 22 and resistive layer 24 and protective layer 26, among others), wherein the layer is formed through application or accumulation of a material to a substrate or another layer using processes associated with thick film, thin film, thermal spraying, or sol-gel, among others. These processes are also referred to as "layered processes" or "layered heater processes."

In order for the resistive layer 24 to serve both the function of a temperature sensor in addition to a heater element, the resistive layer 24 is preferably a material having a relatively high temperature coefficient of resistance (TCR). As the resistance of metals increases with temperature, the resistance at any temperature t (° C.) is:

$$R = R_0(1 + \alpha t) \qquad \text{(Equation 1)}$$

where: $R_0$ is the resistance at some reference temperature (often 0° C.) and $\alpha$ is the temperature coefficient of resistance (TCR). Thus, to determine the temperature of the heater, a resistance of the heater is calculated by the two-wire controller 14 as described in greater detail below. In one form, the voltage across and the current through the heater is measured using the two-wire controller 14, and a resistance is calculated based on Ohm's law. Using Equation 1, or similar equations known to those skilled in the art of temperature measurement using Resistance Temperature Detectors (RTDs), and the known TCR, temperature of the resistive layer 24 is then calculated and used for heater control.

Therefore, in one form of the present invention, a relatively high TCR is preferred such that a small temperature change results in a large resistance change. Therefore, formulations that include materials such as platinum (TCR=0.0039 $\Omega/\Omega/°$ C.), nickel (TCR=0.0041 $\Omega/\Omega/°$ C.), or copper (TCR=0.0039 $\Omega/\Omega/°$ C.), and alloys thereof, are preferred for the resistive layer 24.

However, in other forms of the present invention, a material for the resistive layer 24 need not necessarily have a high TCR. For example, a negative TCR material, or a material having a non-linear TCR, would also fall within the scope of the present invention, as long as the TCR is predictable. If the TCR of a given material is known, if it can be measured with the necessary accuracy, and if it is repeatable or predictable, then the material could be used to determine temperature of the heater system 10. Such a TCR, including the relatively high TCR materials as described, are hereinafter referred to as having sufficient TCR characteristics. Accordingly, the materials described herein and their related high TCRs should not be construed as limiting the scope of the present invention. The relatively high TCR as described herein are preferred in one form of the present invention.

As another sufficient TCR characteristic, the material used for the resistive layer 24 must not exhibit excessive "drift," which is a tendency of many resistive elements to change characteristics, such as bulk resistivity or TCR, over time. Therefore, the material for the resistive layer 24 is preferably stable or predictable in terms of drift, however, the drift can be compensated for over time through calibration of the two-wire controller 14 that is described in greater detail below. Additionally, drift can be reduced or eliminated through "burn-in" of the heater to induce any resistance shift that would occur over time. Accordingly, the resistive layer 24 is preferably a material that has a relatively high temperature coefficient of resistance and that is stable in terms of drift. However, if the drift is predictable, the material may be used for the resistive layer while remaining within the scope of the present invention.

In one form of the present invention, the resistive layer 24 is formed by printing a resistive material on the dielectric layer 22 as previously set forth. More specifically, two (2) resistive materials were tested for use in the present invention, RI1 and RI2, wherein the TCR of RI1 was between approximately 0.0008 $\Omega/\Omega/^\circ$ C. and approximately 0.0016 $\Omega/\Omega/^\circ$ C., and the TCR of RI2 was between approximately 0.0026 $\Omega/\Omega/^\circ$ C. and approximately 0.0040 $\Omega/\Omega/^\circ$ C. Additionally, temperature drift was tested for RI1 and RI2, at various temperatures, and the drift varied from approximately 3% for RI1 to approximately 10% for RI2. With a "burn-in" as previously described, the drift was shown to have been reduced to approximately 2% for RI1 to approximately 4% for RI2. The materials for the resistive layer 24 and their respective values for TCR and temperature drift as described herein are exemplary in nature and should not be construed as limiting the scope of the present invention. Any resistive material having sufficient TCR characteristics as previously set forth can be utilized for the resistive layer 24 while remaining within the scope of the present invention.

Since a plurality of layered heaters having temperature sensing capabilities are employed according to the present invention, the two-wire controller 14 must be provided with certain information about the heaters, and more specifically the resistive layers 24, in order to properly calibrate the overall heater system. Parameters that are necessary for such calibration include the cold resistance, the temperature at which the cold resistance value was measured, and certain TCR characteristics (TCR at a temperature and/or over a temperature range) in order to determine heater temperature from heater resistance calculations. Preferably, the system automatically calculates the cold resistance of each layered heater 12 based on the measured voltage and current using the two-wire controller 14 as described in greater detail below. Additionally, the TCR characteristics for each layered heater 12 must be entered into the system, e.g. the two-wire controller 14, using manual and/or electronic methods. Such values may be entered individually or as a single value for all layered heaters 12 depending on, for example, whether or not the material for the resistive layer 24 came from a common manufacturing lot. Regardless, the calibration data, namely, the cold resistance, cold resistance temperature, and TCR of each layered heater 12 is preferably entered into the two-wire controller 14 for more accurate and controlled operation of the heater system 10.

A variety of methods of providing the TCR characteristics and cold resistance data of each layered heater 12 to the two-wire controller 14 may be employed while remaining within the scope of the present invention. For example, each layered heater 12 may include a bar-coded tag that would be scanned by an operator to download the cold resistance data and TCR characteristics to the two-wire controller 14. Alternately, a smart card chip or other electronic means may be attached to each layered heater 12, which would similarly be scanned by an operator to download the calibration data to the two-wire controller 14. In yet another form, the calibration data may be downloaded to the two-wire controller 14 via the Internet, for example, through a supplier website. Alternately, the TCR characteristics and cold resistance data may be pre-programmed into the two-wire controller 14.

In addition to calibration for resistance data and TCR, compensation for the resistance of electrical leads 30 is also provided by the heater system 10 according to the present invention. Since the electrical leads 30 add resistance to the circuit, temperature errors would likely result if no compensation for the increase in resistance were provided. Additionally, the materials used for the electrical leads 30 may have a TCR higher than that of the resistive layer 24, which results in the portion of the electrical leads 30 that are exposed to higher temperatures contributing more resistance. Therefore, the two-wire controller 14 also provides for calibration of lead wire resistance.

The two-wire controller 14 is preferably designed with temperature calibration capabilities, which further reduces long term temperature errors due to drift. One method of temperature calibration is accomplished by using one or more pre-existing thermocouples, or other pre-existing temperature sensors, to ascertain both the temperature and the stability of the temperature. The temperature data from the thermocouples is then transmitted to the two-wire controller 14 for the resistance calculations. Further, changes in the measured cold resistance of the layered heater 12 may be used to calculate new TCR values as appropriate. In another form for temperature calibration, the two-wire controller 14 preferably comprises a calibration offset feature that provides for input of a temperature offset parameter. Such an offset is desirable when the location of the layered heater 12 is some distance away from the optimum location for sensing temperature. Thus, the temperature offset parameter may be used such that the heater system 10 provides a temperature that more closely represents the actual temperature at the optimum location.

Turning now to the construction of the layered heater 12 as shown in FIGS. 4a–4c, the resistive layer 24 is preferably disposed on the dielectric layer 22 in a pattern 40 that results in a desired temperature profile for the given substrate or element being heated. FIG. 4a shows a resistive layer 24a in a rectangular pattern 40a based on the rectangular profile of the substrate 20a. FIG. 4b shows a resistive layer 24b in a circular pattern 40b based on the circular profile of the substrate 20b. FIG. 4c shows a resistive layer 24c in a spiral pattern 40c based on a cylindrical shape of the substrate 20c. Additionally, the width "W" and/or pitch "P" of the patterns 40a–c may also be altered according to the specific heating requirements of the heater system. Therefore, the pattern of the resistive layer 24a is preferably customized for each application of the heater system 10. The patterns illustrated herein are exemplary only and are not intended to limit the scope of the present invention.

The layered heater 12, including each of the layers and the terminal pads 28 may also be constructed in accordance with U.S. Pat. Nos. 6,410,894, 6,222,166, 6,037,574, 5,973,296, and 5,714,738, which are commonly assigned with the present invention and the contents of which are incorporated herein in their entirety, while remaining within the scope of the present invention. Accordingly, additional specificity with regard to further materials, manufacturing techniques, and construction approaches are not included herein for purposes of clarity and reference is thus made to the patents incorporated by reference herein for such additional information.

Two-Wire Controller (14)

Figure 5:
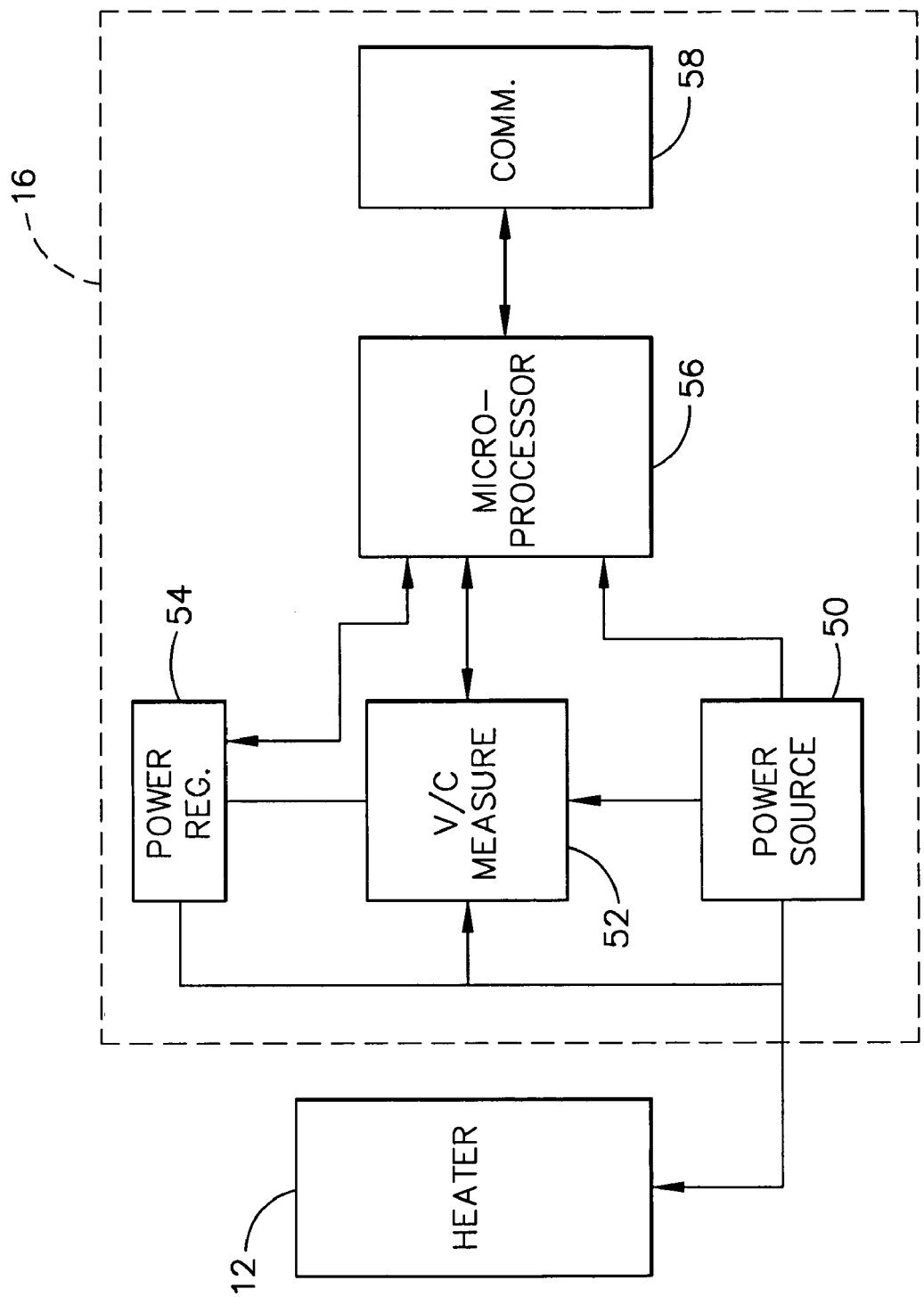
FIG. 5 is a block diagram illustrating a two-wire control system in accordance with the principles of the present invention.

One form of the two-wire controller 14 is illustrated in block diagram format in FIG. 5. As shown, the two-wire controller 14 generally comprises a power source 50, a voltage and current measurement component 52, a power regulator component 54, and a microprocessor 56 in communication with the layered heater 12. The microprocessor 56 is also in communication with a communications component 58, where certain output from the heater system 10 (e.g., temperature readings) is delivered and also where input (e.g., updated TCR values, calibration data, temperature set points, resistance set points) may be provided to the heater system 10.

Figure 6:
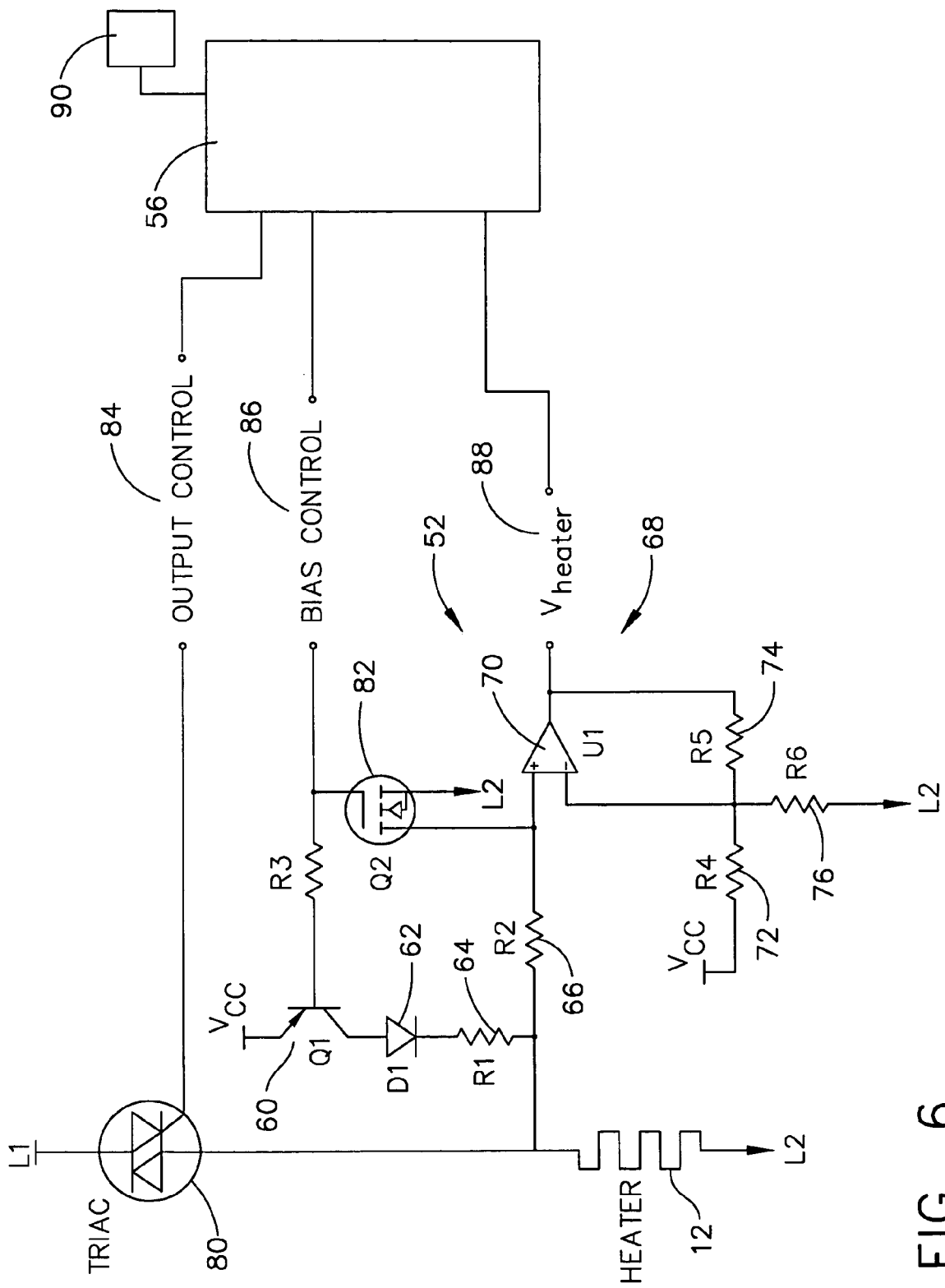
FIG. 6 is a simplified electrical schematic of a two-wire control system constructed in accordance with the teachings of the present invention.

Referring now to FIG. 6, the voltage measurement component 52 of the two-wire controller 14 is illustrated in greater detail. Generally, the two-wire controller 14 applies a DC bias, or low level DC current, to the layered heater 12 during an AC power cycle zero-cross interval so that the current value times a nominal heater resistance results in a voltage that is higher than the full wave voltage at the zero crossing for a time period on each side of the zero value. During the time interval, the voltage of the layered heater 12 is amplified and compared to a reference voltage, and power to the layered heater 12 is then controlled as further described herein. Application of the DC bias is further shown and described in U.S. Pat. No. 4,736,091, which is commonly assigned with the present application and the contents of which are incorporated by reference in their entirety. In another form of the present invention, an AC current may be used for the bias instead of the DC bias to determine the resistance of the layered heater 12.

As shown, the two-wire controller 14 comprises a transistor 60, a diode 62, and a first resistor 64, wherein the first resistor 64 together with the layered heater 12 form a voltage divider. For the DC bias, the transistor 60 is turned on for a short time period, e.g., 200 μs, during the zero cross interval and further prevents current flow through the power source 50 (not shown) during negative half cycles when the heater is receiving power. Additionally, the diode 62 prevents current flow through the power source 50 during positive half cycles when the layered heater 12 is receiving power. The output of the layered heater 12 is then sent through a second resistor 66 and into an opamp circuit 68 that comprises an amplifier 70 and resistors 72, 74, and 76. The output voltage of the amplifier 70 is thus used to calculate resistance and determine the temperature of the layered heater 12, wherein the output voltage of the amplifier 70 is read by an A/D converter within the microprocessor 56. Further, during the DC bias time period, conversion of the output voltage of the amplifier 70 from an analog signal to a digital signal takes place, and a gating pulse from a triac 80 is delivered to the layered heater 12 if the calculated resistance, or layered heater 12 temperature, is such that a control algorithm has determined a need for additional power from the layered heater 12. As further shown, a field effect transistor 82 clamps the input of the amplifier 70, thereby preventing the amplifier 70 from being over driven during both positive and negative half cycles when the heater is receiving line power.

The microprocessor 56, which is described in greater detail below, generally communicates with the circuit shown through an output control 84, a bias control 86, and heater input 88. Additionally, the microprocessor 56 further comprises firmware 90, and/or software (not shown). The firmware 90 may be programmed for a variety of functions, including but not limited to, allowing half cycle delivery of power to improve controllability or full cycle power in accordance with IEEE 519. As a further example, the firmware 90 may include control algorithms to compensate for thermal transient response and other calibration data as previously described. Therefore, the microprocessor 56 is used in combination with the DC bias circuitry to determine layered heater 12 temperature and to more efficiently control power to the layered heater 12.

Figure 7:
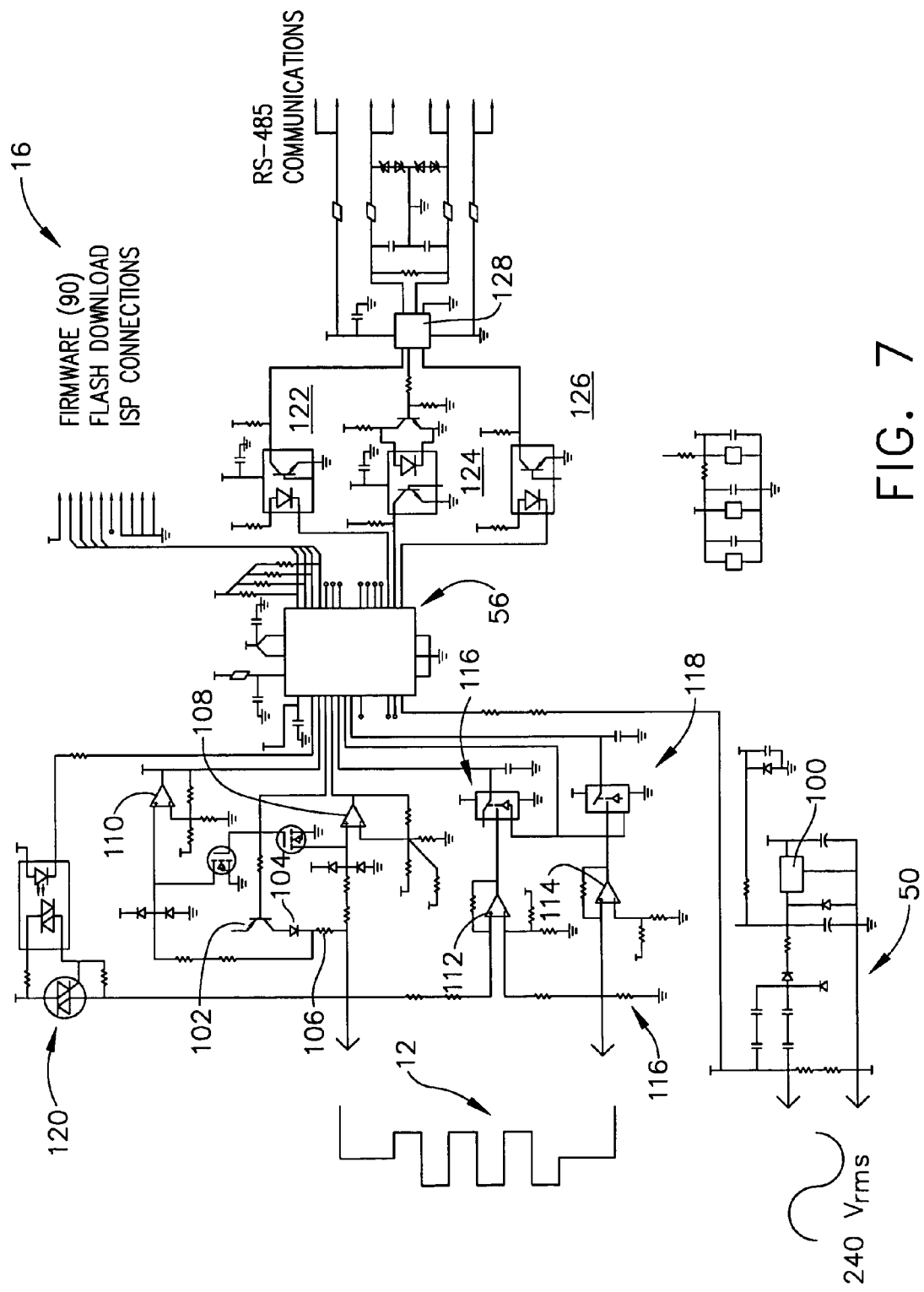
FIG. 7 is a detailed electrical schematic of a two-wire control system constructed in accordance with the teachings of the present invention.

A further expansion of the two-wire controller 14 is now shown in greater detail in FIG. 7. The power source 50 is preferably non-isolated and capacitively coupled with a linear regulator 100 as shown. The power source 50 thus regulates an alternating current down to a specified value as required for operation. As further shown, the sine wave for the zero-cross (DC biasing) from the power source 50 is in communication with the microprocessor 56. During the zero-cross interval, the DC bias is applied through the transistor 102, diode 104, and resistor 106. The voltage across the layered heater 12 is amplified and offset by the amplifier 108, and the amplifier 110 is used as a reference for the A/D converter within the microprocessor 56 for temperature variances.

Measurement of the change in voltage across and current through the layered heater 12 is accomplished using the dual amplifiers 112 and 114 and analog switches 116 and 118, wherein the change in voltage signal is through amplifier 112 and analog switch 116, and the change in current is through amplifier 114 and analog switch 118. As further shown, the change in current is measured using a shunt resistor 1 16. Additionally, the two-wire controller 14 comprises a triac 120 that is out of conduction at the zero-cross and is conducting on each half cycle. During the DC biasing interval, an A/D conversion takes place and the triac 120 delivers a pulse if the measured resistance is such that the control algorithm has determined a need for additional power from the layered heater 12. Therefore, two methods of calculating resistance are provided by the circuit shown in FIG. 7, namely, the DC bias circuit and the shunt resistor circuit. Additionally, although the present invention preferably measures voltage and current to determine resistance, alternate methods of determining resistance such as a voltage gate or using a known current may also be employed while remaining within the scope of the present invention.

In yet another form, the triac 120 is preferably a random fire triac such that the layered heater 12 is fired at high conduction angles to reduce the amount of energy that is delivered to the layered heater 12 during sampling. For example, firing the layered heater 12 at conduction angles of 160° and 340° allows for sufficient sampling at 120 Hz with reduced energy input to the layered heater 12. Alternately, sampling at only 160° or only 340° would result in a sampling rate of 60 Hz while reducing the energy input further in half. Additionally, when using a random fire triac, any rate function may be applied by delivering energy in smaller increments as the temperature (or resistance in another form) approaches the set point. Accordingly, the layered heater 12 is fired at higher and higher conduction angles into a full line cycle.

As further shown, communications to and from the two-wire controller 14 take place on the opposite side of the microprocessor 56. The communications component 58 comprises a series of opto-isolators 122, 124, and 126, in addition to a line transceiver 128. Therefore, communications can be made through any number of protocols, including by way of example, RS-485 communications as illustrated herein. In addition to other functions, calibration data can be entered utilizing this communications interface.

The firmware 90 is loaded into the microprocessor 56 using the ISP (In-System Programming) connections as shown. Therefore, certain modifications to the settings within the two-wire controller 14, including entry of calibration data as previously described, can be accomplished in an efficient manner.

The specific circuit components, along with the values and configuration of the circuit components, (e.g., resistor values, capacitor values, among others), as detailed in FIG. 7 are exemplary of one form of the two-wire controller 14 and should not be construed as limiting the scope of the present invention. Accordingly, alternate circuit components, configurations, and values, and resistance measuring circuit topologies may be implemented in a two-wire configuration as defined herein while remaining within the scope of the present invention.

Hot Runner Nozzle Application

Figure 8:
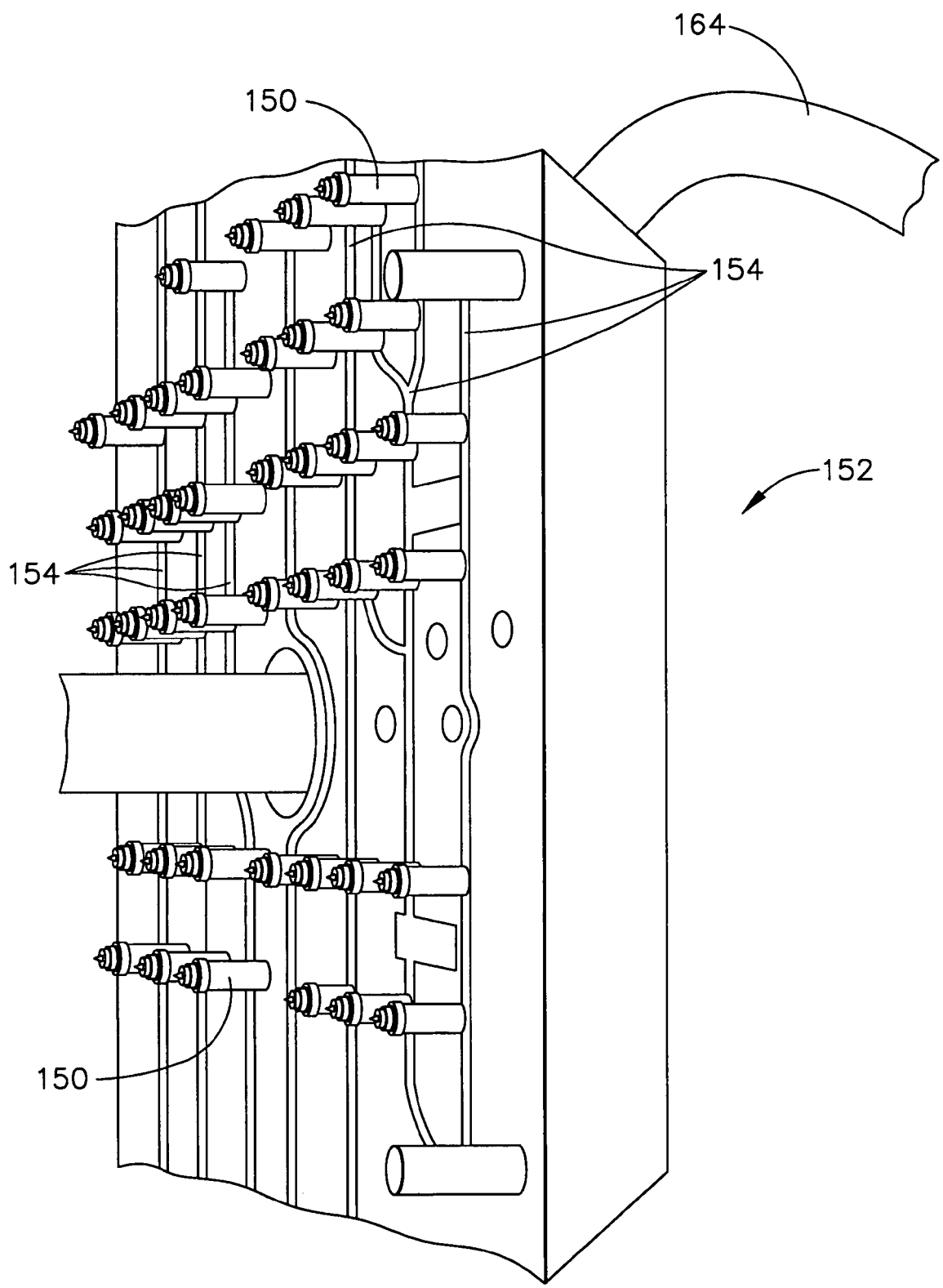
FIG. 8 is a perspective view of a high cavitation mold for an injection molding system having a heater system with hot runner nozzles and constructed in accordance with the teachings of the present invention.

One known application for the heater system 10 according to the principles of the present invention is for hot runner nozzles in injection molding systems as shown in FIG. 8. The hot runner nozzles 150 are typically disposed within a hot runner mold system 152, which further comprises a plurality of mold wiring channels 154 that provide for routing of electrical leads (not shown) that run from heaters (not shown) disposed proximate the hot runner nozzles 150 to a two-wire controller (not shown) as described herein. Since each heater serves as both a heating element and as a temperature sensor, only one set of leads per heater is required rather than one set of leads for the heater and one set of leads for a temperature sensor. As a result, the amount of leads running through the mold wiring channels 154 is reduced in half and the related bulk and complexity is drastically reduced.

Additionally, injection molding equipment typically includes an umbilical 164 that runs from the controller to the hot runner mold system 152, wherein all of the leads and other related electrical components are disposed. With the drastic reduction in the number of leads provided by the present invention, the size and bulk of the umbilical 164 is also drastically reduced. Moreover, since the temperature is being sensed by the entire resistive layer of the heater, the temperature is being sensed over a length rather than at a point with a conventional thermocouple.

Figure 9:
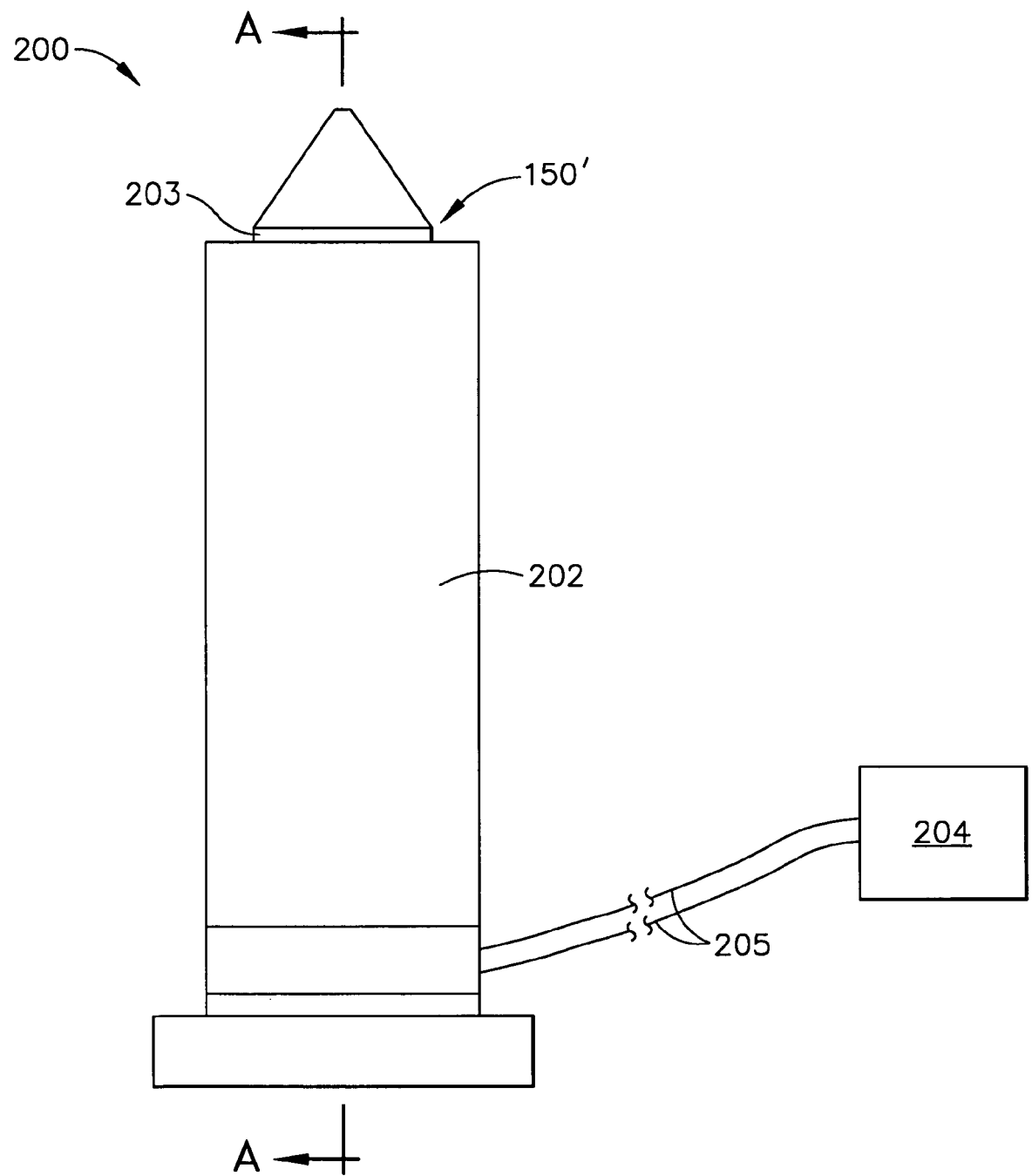
FIG. 9 is a side view of a hot runner nozzle heater system constructed in accordance with the teachings of the present invention.
Figure 10:
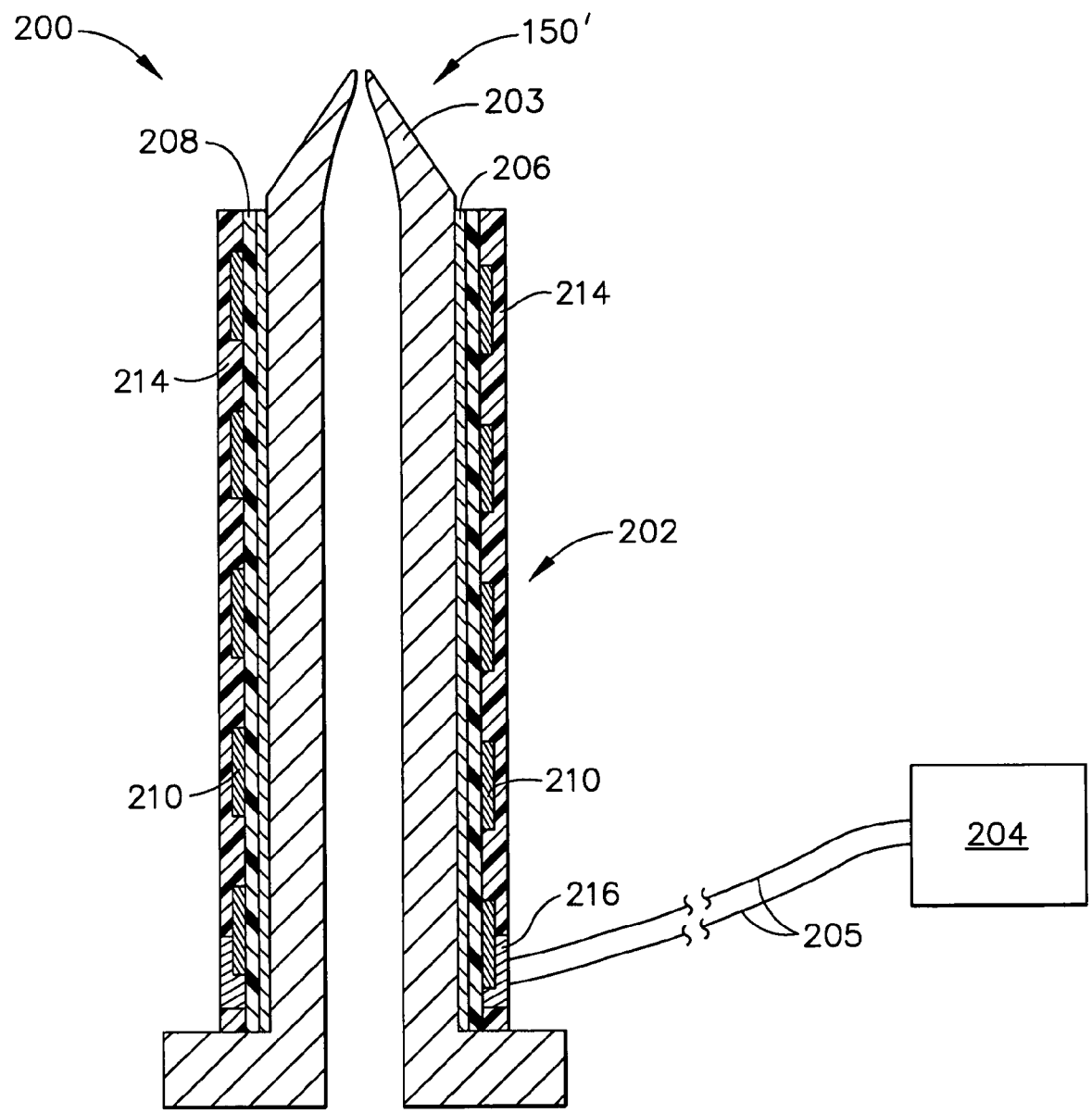
FIG. 10 is a side cross-sectional view of the hot runner nozzle heater system, taken along line A—A of FIG. 9, in accordance with the principles of the present invention.

Referring now to FIGS. 9 and 10, the heater system for a hot runner nozzle 150' is illustrated in greater detail. The heater system 200 comprises a layered heater 202 disposed around a body 203 of the hot runner nozzle 150', and a two-wire controller 204 in communication with the layered heater 202 through a single set of leads 205. The layered heater 202 further comprises a substrate 206, which is configured to fit around the geometry of the hot runner nozzle 150' (shown as cylindrical). The layered heater 202 further comprises a dielectric layer 208 disposed on the substrate 206, a resistive layer 210 disposed on the dielectric layer 208, and a protective layer 214 disposed on the resistive layer 210. As further shown, terminal pads 216 are disposed on the dielectric layer 208 and are in contact with the resistive layer 210. Accordingly, the electrical leads 205 are in contact with the terminal pads 216 and connect the resistive layer 210 to the two-wire controller 204. As a result, only one set of electrical leads 205 are required for the heater system 200, rather than one set for the layered heater 202 and another set for a separate temperature sensor.

Figure 11:
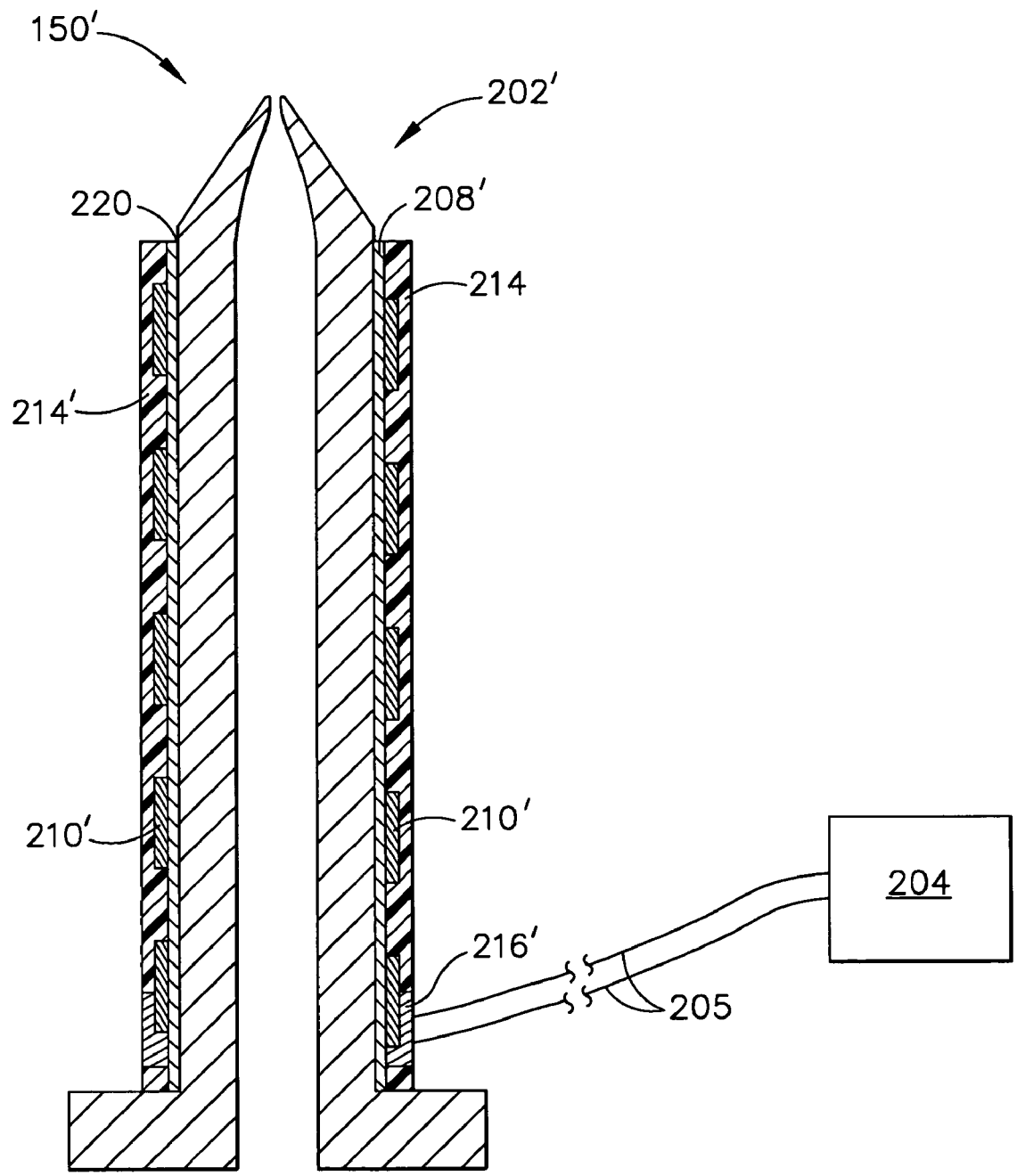
FIG. 11 is a side cross-sectional view of an alternate embodiment of the hot runner nozzle heater system constructed in accordance with the teachings of the present invention.

As shown in FIG. 11, in an alternate form a layered heater 202' is disposed on an outer surface 220 of the hot runner nozzle 150' rather than on a separate substrate as previously described. Similarly, the layered heater 202' comprises a dielectric layer 208' disposed on the outer surface 220, a resistive layer 210' disposed on the dielectric layer 208', and a protective layer 214' disposed on the resistive layer 210'. Terminal pads 216' are similarly disposed on the dielectric layer 208' and are in contact with the resistive layer 210'. As further shown, the single set of leads 205' connect the heater 202' to the two-wire controller 204'.

Figure 12:
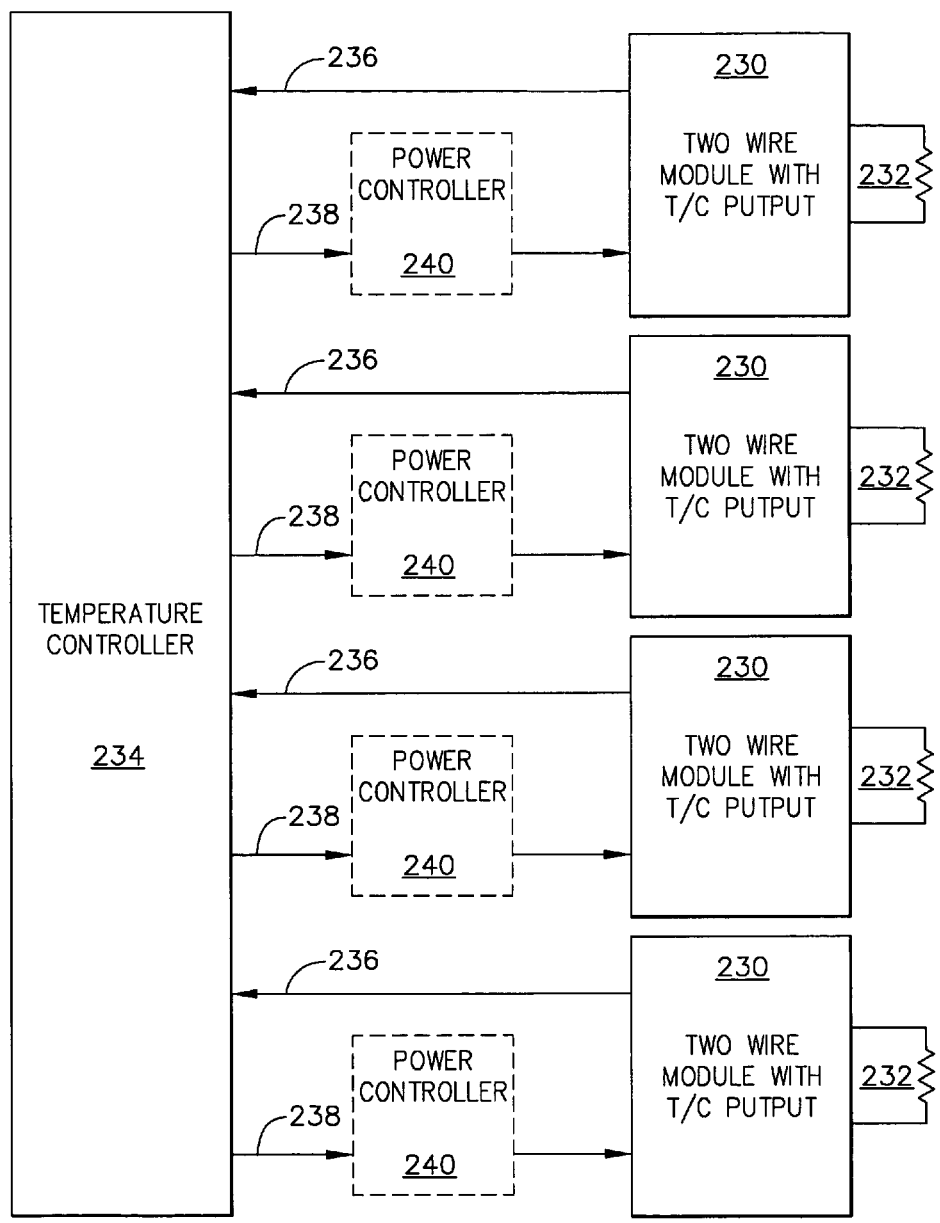
FIG. 12 is a schematic diagram of a modular heater system for retrofit into existing systems in accordance with the principles of the present invention.

In yet another form of the present invention, a modular solution to retrofitting the heater system according to the present invention with existing controllers that use separate temperature sensors, e.g., thermocouples, RTDs, thermistors, is provided and illustrated in FIG. 12. As shown, two-wire modules 230 are provided between layered heaters 232 and an existing temperature controller 234. The temperature controller 234 comprises temperature sensor inputs 236 and power outputs 238. The two-wire modules 230 thus contain the two-wire resistance measuring circuit as previously described, and the temperatures calculated within the two-wire modules 230 are transmitted to the temperature sensor inputs 236 of the existing temperature controller 234. Based on these temperature inputs, the temperature controller 234 controls the layered heaters 232 through the power outputs 238. It should be understood that power control may be a part of the temperature controller 234 or may be a separate power controller 240 as shown while remaining within the scope of the present invention. Accordingly, existing temperature controllers can be retrofitted with the two-wire modules 230 to implement the heater system of the present invention without substantial rework and modification of existing systems.

Figure 13:
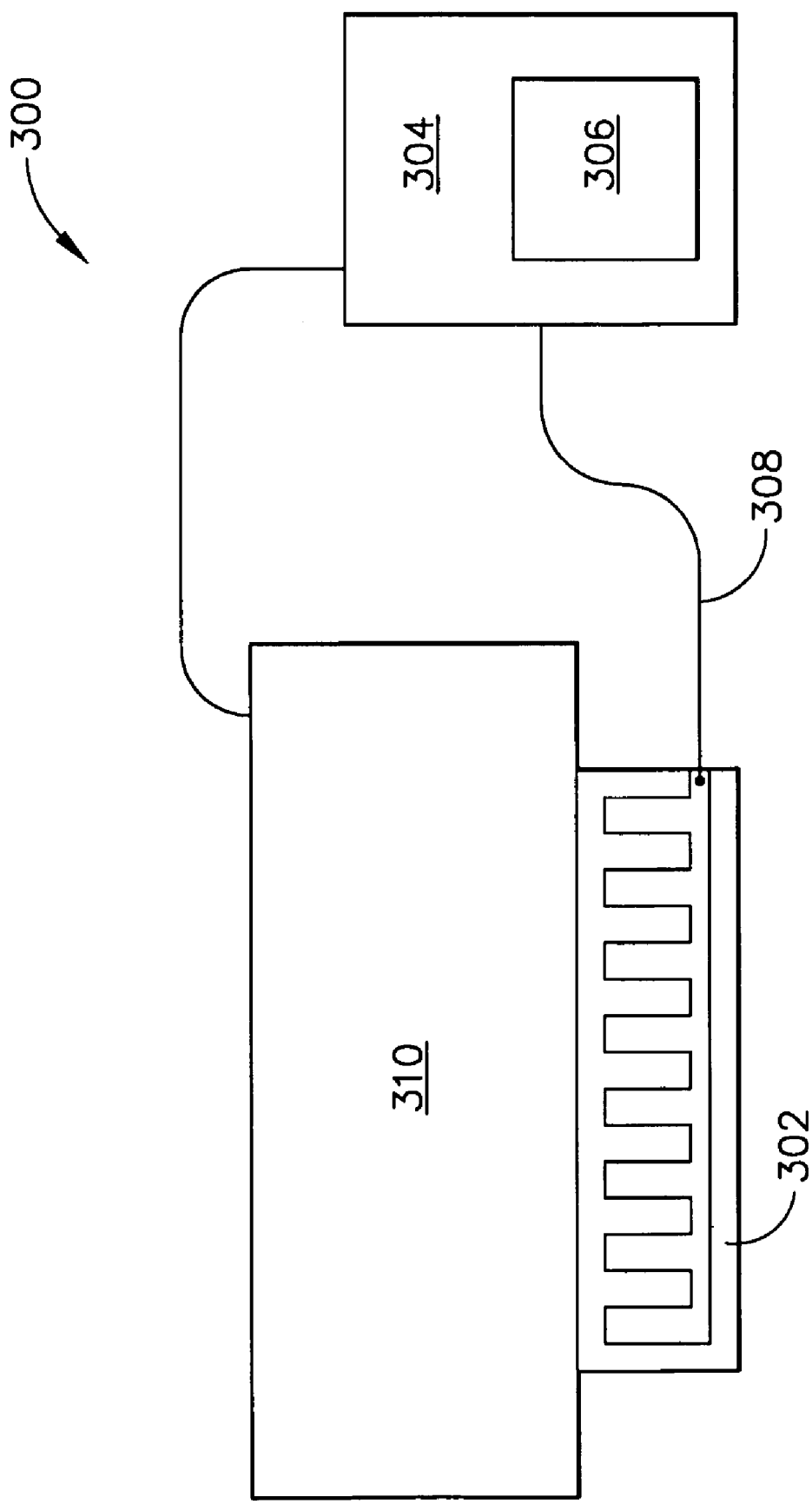
FIG. 13 is a block diagram of a heater system using a single wire in accordance with the principles of the present invention.

Referring now to FIG. 13, another form of a heater system according the present invention that reduces the number of electrical leads is illustrated and generally indicated by reference numeral 300. The heater system 300 comprises a layered heater 302 and a controller 304 that operate as previously described wherein a resistive layer (not shown) of the layered heater 302 is both a heating element and a temperature sensor. The heater system 300 further comprises a power source 306, which is preferably low voltage in one form of the present invention, that provides power to the layered heater 302. The layered heater 302 is connected to the controller 304 as shown through a single electrical lead 308 and through the body or structure of a device 310 (e.g., hot runner nozzle system mold) designated as a common return or neutral, wherein the common return device 310 provides an electrical return to the controller 304 from the layered heater 302. The heater system 300 uses the electrically conductive nature of the device 310 materials to complete the electrical circuit, and thus a power source 306 is required to limit the current level traveling through the device 310. Therefore, since the device structure 310 is being used to connect the layered heater 302 to the controller 304, another electrical lead is eliminated such that the controller 304 is effectively a "single-wire controller."

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A heater system comprising:
    a substrate disposed proximate a part to be heated;
    a layered heater disposed proximate the substrate, the layered heater comprising:
        at least one dielectric layer;
        at least one resistive layer disposed on the dielectric layer, the resistive layer having sufficient temperature coefficient of resistance characteristics such that the resistive layer is a heater element and a temperature sensor;

two electrical lead wires connected to the resistive layer; and a two-wire controller connected to the resistive layer through the two electrical lead wires, wherein the two-wire controller determines temperature of the layered heater using the resistance of the resistive layer and controls heater temperature accordingly through the two electrical lead wires, wherein the heater system provides heat to the part to be heated.

2. The heater system according to claim 1, wherein the two-wire controller comprises a DC bias control for calculation of the resistance of the resistive layer.

3. The heater system according to claim 1, wherein the two-wire controller comprises an AC bias control for calculation of the resistance of the resistive layer.

4. The heater system according to claim 1, wherein the two-wire controller comprises high conduction angle firing.

5. The heater system according to claim 1, wherein the two-wire controller comprises a shunt resistor for calculation of the resistance of the resistive layer.

6. The heater system according to claim 1, wherein the two-wire controller further comprises a microprocessor.

7. The heater system according to claim 1, wherein the two-wire controller further comprises firmware.

8. A method of operating a layered heater comprising the steps of:

placing a substrate proximate a part to be heated;

supplying power to the layered heater through two electrical lead wires to a resistive layer of the layered heater;

transferring heat from the resistive layer, through a dielectric layer of the layered heater, and to the substrate; and calculating the temperature of the resistive layer using a two-wire controller connected to the layered heater through the two electrical lead wires, wherein the resistive layer is a heater element and a temperature sensor.

9. The method according to claim 8, further comprising the step of resistance data calibration.

10. The method according to claim 8, further comprising the step of lead wire calibration.

11. The method according to claim 8, further comprising the step of temperature calibration.

12. The method according to claim 8, further comprising the step of TCR calibration.

13. The heater system according to claim 1, wherein the layered heater is selected from a group consisting of thick film, thin film, thermal spray, and sol-gel.

* * * * *